(No Model.)
S. SCHMAUS.
KNOB ATTACHMENT.
No. 403,223. Patented May 14, 1889.
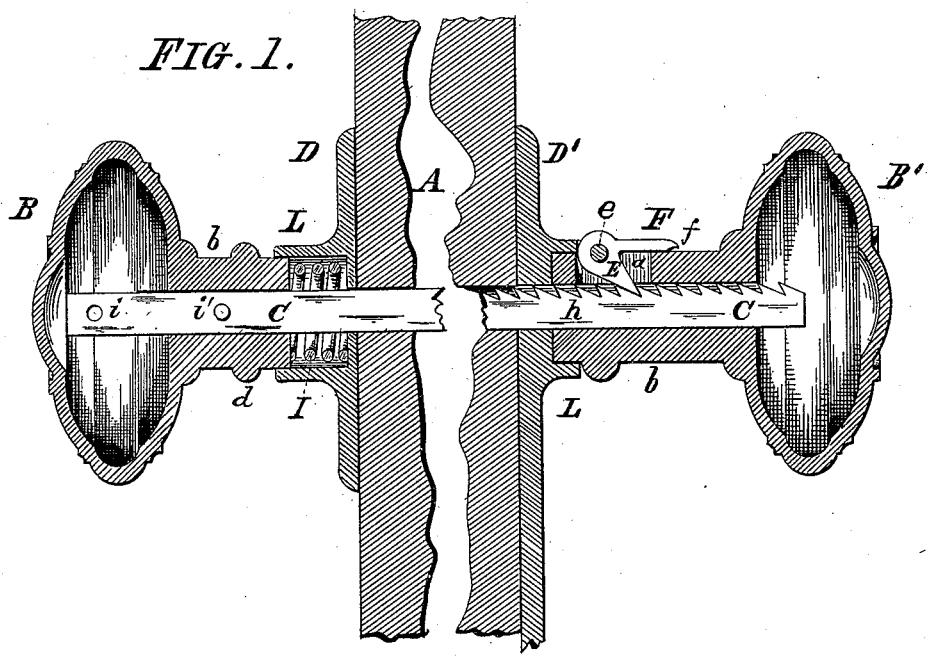
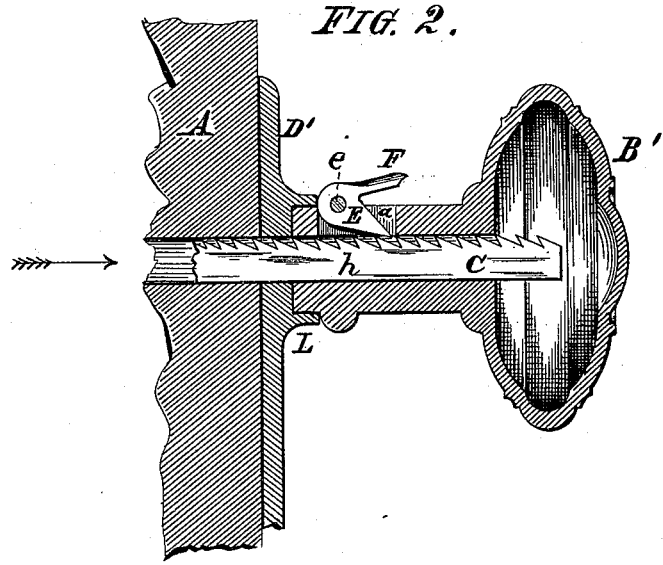
Witnesses:
Wm O Stark
F. Gingras
Inventor:
Simon Schmaus,
by Michael J Stark,
Attorney.

UNITED STATES PATENT OFFICE.

SIMON SCHMAUS, OF BUFFALO, NEW YORK.

KNOB ATTACHMENT.

SPECIFICATION forming part of Letters Patent No. 403,223, dated May 14, 1889.

Application filed February 6, 1889. Serial No. 298,865. (No model.)

*To all whom it may concern:*

Be it known that I, SIMON SCHMAUS, of Buffalo, in the county of Erie and State of New York, have invented certain new and useful Improvements in Door-Knob Fasteners; and I do hereby declare that the following description of my said invention, taken in connection with the accompanying sheet of drawings, forms a full, clear, and exact specification, which will enable others skilled in the art to which it appertains to make and use the same.

This invention has general reference to door-knob fasteners; and it consists, essentially, in the novel and peculiar combination of parts and details of construction, as hereinafter first fully set forth and described, and then pointed out in the claims.

In the drawings already referred to, which serve to illustrate my said invention more fully, Figure 1 is a longitudinal sectional elevation of a pair of door-knobs provided with my improved fasteners. Fig. 2 is a similar view of the same, showing the dog of the knob disengaged from the spindle.

Like parts are designated by corresponding letters of reference in both the figures.

The object of this invention is the production of an efficient fastener for the knobs of doors, so that they may be instantly attached to or detached from their spindles. To accomplish this object, I construct my door-knob fastener substantially as follows:

A indicates the usual door, made of any desired thickness and style.

B B' are the knobs of a lock, &c.

C is the spindle. The knob B is attached to said spindle by a pin, $i'$, passing through one of a series of holes, $i$, in said spindle, while the knob B' is removably affixed to said spindle by a dog, E, pivoted to the shank $b$ of said knob by a pin, $e$, as clearly shown in Fig. 1. The dog E is of substantially V shape, the pivotal point being in the angle of the same, so that one arm of the same serves as a thumb-piece and the other opposite arm as a hook or catch to engage the serrations or teeth $h$ in said spindle, in the manner hereinafter to be described.

D D' are two door plates, the former having the annular projecting ring L, of a depth somewhat exceeding that of the latter, for the object of affording a recess for the reception of a spiral spring, I, which spring tends to draw the spindle C in the direction opposite from that indicated by an arrow in Fig. 2, and thereby to pull the dog E into intimate contact with one of the serrations $h$ in the spindle C.

When in a normal position, the thumb-piece F of the dog E rests upon the outside of the shank $b$, and in this position the knob B' is locked to the spindle by said dog; but when the knob B is pushed inward, so as to move the spindle C in the direction of the arrow in Fig. 2, the dog will be disengaged from the serrations $h$, so that the knob B' may be removed from said spindle, the notch $f$, Fig. 1, in the thumb-piece assisting in lifting the same for this purpose.

By the construction heretofore described I attain several advantages over devices having detachable knobs, viz: The dog is locked in position without the use of a spiral or other spring in the shank, the entire locking mechanism being operated by the spring I in the door-plate, which at the same time takes up any play or lost motion in the spindle.

Having thus fully described my invention, I claim as new and desire to secure to me by Letters Patent of the United States—

1. In door-knobs, the combination, with the door A, of the door-plate D, the spindle C, having near one end the holes $i\ i'$, for the reception of a pin for fastening the knob B, and at the other end a series of teeth, $h$, the knob B', having a shank, $b$, provided with an opening, $a$, the pivot $e$, the V-shaped dog E, journaled upon said pivot and engaging the serrations $h$ of the spindle C, and the door-plate D, having a circular recess provided with the spiral spring I, said dog being held in mesh with the serrations in the spindle by said spring pressing upon the knob B and disengaged therefrom by pushing said knob toward the knob B', all as hereinbefore described.

2. In door-knob fasteners, the knob B', having the V-shaped dog pivoted at the point of the angle, in combination with the serrated spindle and the spiral spring in the door-plate, said dog being held in mesh with the serrations by the said spring acting upon the shank of the knob B, in the manner as and for the purpose set forth.

3. The combination, substantially as described, with the serrated spindle C, of the door-knob B, affixed to said spindle by the pin $i'$, the door-plate D, having the annular projecting ring L, fitted with the spiral spring I, and the door-knob B', having the shank $b$, fitted with the pivoted V-shaped dog E, engaging said serrations in the spindle, said dog being locked in position by its thumb-piece F bearing upon the shank $b$ through the intervention of the spiral spring I, as stated.

In testimony that I claim the foregoing as my invention I have hereto set my hand in the presence of two subscribing witnesses.

SIMON SCHMAUS.

Attest:
MICHAEL J. STARK,
WM. O. STARK.